United States Patent Office 3,352,799
Patented Nov. 14, 1967

3,352,799
ORGANOSILICONCARBODIIMIDE POLYMERS AND PROCESS FOR THEIR PREPARATION
Johann F. Klebe and James G. Murray, Schenectady, N.Y., assignors to General Electric Company, a corporation of New York
No Drawing. Filed June 22, 1966, Ser. No. 559,397
5 Claims. (Cl. 260—2)

ABSTRACT OF THE DISCLOSURE

A method of preparing organosiliconcarbodiimide polymers and the polymers produced are described. The polymers are produced by the reaction of a halogen-containing silicon compound with a bis-hexaorganosilylcarbodiimide, whereby a triorganohalosilane and the organosiliconcarbodiimide polymer is formed. The process comprises the step of mixing a bis-triorganosilylcarbodiimide with a halogen-containing organosilicon compound and heating the mixture to a temperature of from 75° C. to 300° C. or higher, whereby the bis-triorganosilylcarbodiimide reacts with the halogen-silicon bond of the halogen-containing silicon compound to produce a triorganohalosilane and the poly(organosiliconcarbodiimide). The polyorganocarbodiimides are useful as insulating coatings and high temperature paints, etc.

---

This invention relates to a process for producing organosiliconcarbodiimide polymers and to the compositions produced thereby. More particularly, this invention relates to an exchange reaction whereby a bis(triorganosilyl)carbodiimide is reacted with halogen-containing silicon compounds having at least two halogen-silicon bonds to produce polymeric organosiliconcarbodiimides, and to the compositions produced thereby.

Heretofore it has been known that bis(triorganosilyl)carbodiimde could be produced by reacting cyanamide with a triorganochlorosilane in the presence of a tertiary amine. (L. Birkofer et al., Tetrahedron Letters, No. 5, p. 195 (1962); J. Pump et al., Ann., 652, 21 (1962).) It was possible by this method to produce silicon compounds containing one carbodiimide linkage and two silicon atoms.

A method has been found whereby the foregoing bis(triorganosilyl)carbodiimide can be converted to polymer silicon compounds containing more than two silicon atoms, and which can contain more than 2 carbodiimide linkages.

The new and novel poly(organosilicon)carbodiimides of this invention include cyclic organosiliconcarbodiimides containing units of the formula (I)

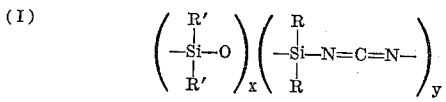

where R and R' are hydrogen, monovalent hydrocarbon radicals, halohydrocarbon radicals or cyanoalkyl radicals, $x$ is an integer of at least 0, $y$ is an integer of at least 1, and the sum of $x+y$ is from 5 to 10, and linear or branched organosiliconcarbodiimides containing units of the formula (II)

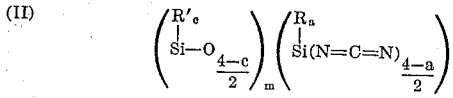

where R and R' have the above-defined meanings, $a$ is an integer of 1 or 2, $c$ is an integer of from 1 to 3, $m$ is an integer and can have a value of from 0 to 10,000 or even higher, $n$ is an integer of at least 1 and can have a value of 1000 or higher, the sum of $m+n$ being at least 2 and can be as high as 10,000 or even higher. It is, of course, obvious to those skilled in the art that R and R' do not necessarily represent the same monovalent hydrocarbon radicals throughout the polymer molecule. Thus, for example, R and R' can be different monovalent hydrocarbon radicals on the same or different silicon atoms.

The monovalent hydrocarbon radicals which R and R' represent are alkyl radicals and cycloalkyl radicals, e.g., methyl, ethyl, propyl, isopropyl, butyl, hexyl, dodecyl, cyclohexyl, etc.; aryl radicals, e.g., phenyl, naphthyl biphenyl, anthracenyl, etc.; aralkyl radicals, e.g., benzyl, phenylethyl, etc.; alkaryl radicals, e.g., tolyl, xylyl, ethylphenyl, trimethylphenyl, etc.; alkenyl radicals, e.g., vinyl, allyl, methallyl, hexenyl, cyclohexenyl, etc.; cyanoalkyl radicals, e.g., cyanomethyl, cyanoethyl, cyanopropyl, etc.; halohydrocarbon radicals, e.g., chlorophenyl, bromophenyl, trifluoropropyl, trifluoromethylphenyl, bromonaphthyl, chloropropyl, etc.

The novel process of this invention comprises forming an admixture of a bis(triorganosilyl)carbodiimide of the formula (III) 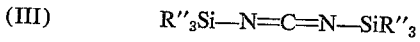

wherein R" is a monovalent organic radical, for example, such as are listed above for R and R', with an organosilicon compound containing at least one silicon-halogen bond, heating the mixture so as to cause the reaction of the bis(triorganosilyl)carbodiimide of Formula III with the silicon-halogen bond to produce a triorganohalosilane and an organosilicon carbodiimide. The triorganohalosilane formed by the reaction is removed by distillation, thereby driving the reaction to completion and yielding the desired poly(organosiliconcarbodiimide). It is preferred to employ organohalosilicon compounds in the process because of their ready availability, and particularly since the triorganohalosilanes formed during the reaction are readily removable by distillation as the reaction proceeds.

The ratio of reactants employed in the process of this invention is not narrowly critical and can vary over wide ranges. For example, one can employ from 0.01 to 100 moles of the bis(triorganosilyl)carbodiimides for each silicon-halogen bond in the halogen-containing organosilicon compound. It is preferred, however, to employ approximately equivalent amounts of the reactants for ease of recovery of the reaction products. Thus, for example, one preferably employs from 0.45 to 0.55 mole of bis(trimethylsilyl)carbodiimide for each equivalent weight of the silicon-bonded halogen in the halogen-containing organosilicon compound. One determines an equivalent weight of the halogen-containing organosilicon starting material by dividing the molecular weight of the latter by the number of silicon-halogen bonds present.

The temperature at which the process of this invention is carried out can be varied widely and can range from about 75° C. to 300° C. or even higher. It is preferred to conduct the process of this invention at a temperature of from about 100° C. to about 200° C.

The process of this invention can be conducted at sub-atmospheric, atmospheric, or super-atmospheric pressures, or under pressures which are varied at different times during the reaction. For example, the pressure at the beginning of the reaction can be maintained above atmospheric pressure then lowered to atmospheric pressure and finally conducted at sub-atmospheric pressure to remove the last traces of volatile reaction products. It is preferred to conduct the reaction initially at atmospheric or super-atmospheric pressure and then in the final stage at sub-atmospheric pressure to remove the last traces of the formed triorganohalosilane and to insure completion of the reaction.

The process of the present invention can be conducted either in the presence or absence of a solvent. The solvents which are useful are those materials which do not react with silicon carbodiimide or the halosilicon compound and which have a high enough boiling point to permit the reaction to proceed at a reasonable rate. Such solvents are, for example, toluene, xylene, diphenyl ether, decalin, N-methylpyrrolidone, chlorobenzene and the like.

The starting organosilicon materials containing at least one silicon-bonded halogen employed in the process of this invention are the halosilanes having the formula (IV)    $R_aSiX_{4-a}$ where R and $a$ have the above-defined meaning, and X is halogen, e.g., fluorine, chlorine, bromine or iodine, or haloorganosiloxanes of the formula (V)
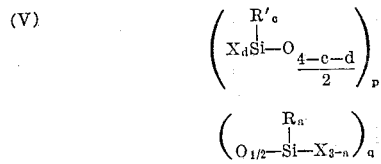

wherein R, R′, X, $a$ and $c$ have the above-defined meanings, $d$ is 0 or 1, the sum of $(c+d)$ being from 1 to 3, and $p$ and $q$ are integers having a value of at least 1 and can be 10,000 or even higher. Thus, for example, the starting materials can be monomeric organosilanes; for example, the methyltrichlorosilane, dimethyldichlorosilane, phenyltrichlorosilane, phenyltribromosilane, diphenyldichlorosilane, diphenyldibromosilane, diethyldichlorosilane, di(phenylethyl)dichlorosilane, methylphenyldichlorosilane, methyltolyldichlorosilane, and mixtures thereof, and the like. The starting materials employed in producing the compositions of this invention also include the halogen terminated polysiloxanes. These halogen terminated polysiloxanes can be produced by methods known to those in the art, examples of which can be found in U.S. 2,381,366—Patnode.

The compositions of this invention are stable at high temperatures and thus find use as resinous insulating coatings for use in situations where high temperatures are encountered, e.g., a high temperature paint. In addition, the compositions are stable toward radiation and thus find use as sealants and gaskets for use where radiation is encountered.

The following examples serve to further illustrate the invention. All parts are by weight unless otherwise stated.

*Example 1*

A mixture of diphenyldichlorosilane (12.66 grams, 0.05 mole) and bis((trimethylsilyl)carbodiimide (10.25 grams, 0.055 mole) was heated at 155° C. to 160° C. for about 2 hours until about 10.7 grams (0.099 mole) of trimethylchlorosilane was collected as a distillate. The heating was continued for an additional 3 hours at 160° C. while drawing a vacuum of 5 mm. Hg on the flask to complete the formation of the carbodiimide polymer and to remove the additional trimethylchlorosilane. The product was a stiff, rubbery gum at room temperature which upon hating to 100° C. became a viscous oil. Elemental analysis gave the following results for the polymeric compound of units of the formula (VI)

where $q$ is a whole number greater than 1.

*Analysis.*—Calculated: C, 70.23%; H, 4.53%; Si, 12.63%; N, 12.60%. Found: C, 70.0%; H, 4.3%; Si, 12.70%; N, 12.9%.

It can be seen from the above that the analysis agrees quite closely with that which would be expected for the production of the compound of units of Formula VI.

The intrinsic viscosity of this polymer as measured in benzene at 25° C. was 0.15. The number average molecular weight as measured by the bullioscopic method was 4265. The infrared spectrum gave absorptions at 2142 cm.$^{-1}$ and at 2232 cm.$^{-1}$ which confirms the presence of the carbodiimide linkages. The polymer had good thermal stability and showed no weight loss even upon heating up to 400° C. under a blanket of nitrogen.

When a sample of the diphenylsilylcarbodiimide polymer of Example 1 was irradiated by an electron beam to a total dosage of 2000 megaroentgens per gram, the polymer was still rubbery although it was no longer soluble in the usual solvents such as toluene, indicating some crosslinking during the irradiation.

*Example 2*

A mixture of phenyltrichlorosilane (10.6 g., 0.05 mole) and bis(trimethylsilyl)carbodiimide (15.5 g., 0.083 mole) was heated at 138° C. There was a rapid distillation of trimethylchlorosilane and a white solid was formed. Heating was continued for an hour at 138° C. in which time 12.8 g. of distillate had been collected. The pressure in the system was then reduced to 0.1 mm. Hg and heating continued at 135° C. for 1 hour. The nearly white, solid product weighed 8.77 g. and the analysis was in close agreement for phenylsilylcarbodiimide $$[C_6H_5—Si(NCN)3/2]_q$$

*Analysis.*—Calculated: C, 54.51%; H, 3.05%; N, 25.43%. Found: C, 52.1%; H, 3.7%; N, 25.4%.

The product was pressed into a film at 3000 p.s.i. and 300° C. for 20 minutes.

*Example 3*

A mixture of diphenyldichlorosilane (20.8 g., 0.08 mole), phenyltrichlorosilane (2.82 g., 0.013 mole) and bis(trimethylsilyl)carbodiimide (19.57 g., 0.105 mole) was heated for three hours at 145°–156° C., while collecting 19.7 g. of distillate during this period. The pressure was reduced to 0.1 mm. Hg and heating continued for an additional three hours at 145°–155° C. The product was a rubbery solid weighing 20.7 g. which analyzed for the expected copolymer $$(C_6H_5)_2Si(NCN)_{0.8}[C_6H_5Si(NCN)3/2]_{0.133}$$

*Analysis.*—Calculated: C, 68.28%; H, 4.35%; N, 14.19%. Found: C, 67.7%; H, 4.8%; N, 13.2%.

What we claim as new and desire to secure by Letters Patent of the United States is:

1. A process for the preparation of poly(organosilicon) carbodiimides which comprises forming a mixture of (1) a silicon compound containing silicon-halogen bonds, said silicon compound selected from the class consisting of halosilanes of the formula $R_a—Si—X_{4-a}$ and haloorganosiloxanes of the formula

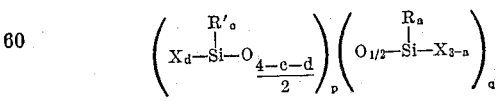

and (2) a bis(triorganosilyl)carbodiimide of the formula $R''_3—Si—N=C=N—Si—R''_3$ wherein R, R′ and R″ are members of the class consisting of alkyl, cycloalkyl, aryl, aralkyl, alkaryl, alkenyl, cyanoalkyl and halohydrocarbon; and X is a halogen, $a$ has a value of 1 or 2, $c$ has a value of from 1 to 3, $d$ has a value 0 or 1, the sum of $c+d$ being from 1 to 3 and $p$ and $q$ are integers having a value of at least 1 and heating the mixture to a temperature of from about 75° C. to 300° C. to cause said silicon compound and said bis(triorganosilyl)carbodiimide to react to produce said poly(organosilicon)carbodiimides.

2. A process as claimed in claim 1 wherein the silicon compound containing silicon-halogen bonds is diphenyldichlorosilane.

3. A process as claimed in claim 1 wherein the temperature of reaction is from 100° C. to 200° C.

4. A process as claimed in claim 1 wherein the silicon compound containing silicon-halogen bonds is phenyltrichlorosilane.

5. A process as claimed in claim 1 wherein said silicon compound containing silicon-halogen bonds is a mixture of diphenyldichlorosilane and phenyltrichlorosilane.

References Cited

Birkofer et al., Tetrahedron Letter (1962), No. 5, pp. 195–198.

Pump et al., Justus Liebigs Annalen der Chemie, pp. 21–27 (1962).

Pump et al. Z. Anorg Allgem, Chem., Band 330 (1964), pp. 101–106.

DONALD E. CZAJA, *Primary Examiner.*

M. I. MARQUIS, *Assistant Examiner.*